Patented Dec. 9, 1941

2,265,185

UNITED STATES PATENT OFFICE 2,265,185

BASIC ESTERS AND AMIDES AND PROCESS OF PRODUCING SAME

Karl Miescher, Riehen, and Karl Hoffmann, Basel, Switzerland, assignors, by mesne assignments, to Ciba Pharmaceutical Products, Incorporated, Summit, N. J., a corporation of New Jersey No Drawing. Application July 7, 1939, Serial No. 283,319. In Switzerland August 5, 1938

8 Claims. (Cl. 260—468)

This invention relates to the manufacture of basic esters and amides of alicyclic or aryl-alicyclic fatty acids by treating with a reducing agent a basic ester or amide of a fatty acid containing one or more unsaturated nuclei.

The saturation of the unsaturated nuclear double-linkages in accordance with the invention may be brought about by methods in themselves known. In this connection reference may be made to Houben-Weyl, "Die Methoden der Organischen Chemie," 3rd edition, vol. 2, (1925), pages 326 et seq. Reduction by a catalytic method, for instance with use of noble metals such as platinum as catalysts, is particularly advantageous.

There may be used as parent materials any basic esters and amides of fatty acids which contain unsaturated nuclei. There may here be mentioned by way of example basic esters and amides of phenyl-fatty acids, naphthalene-fatty acids and the like. These parent materials may be prepared according to known processes, for example as described in Patents 2,079,962 and 2,009,144.

The hitherto known basic esters of fatty-aromatic carboxylic acids, for example atropine, scopolamine, diphenyl acetic acid diethylamino ethanol ester and others undergo a hydrolytic decomposition when their salts are kept in aqueous solution. Surprisingly it has been found that the new basic esters have a very considerably greater stability. Thus for example the sulfate of dicyclohexyl acetic acid diethylamino ethanol ester and the hydrochloride of phenyl-cyclohexyl acetic acid diethylamino ethanol ester can be sterilized for 10 hours without undergoing decomposition, whereas aqueous solutions of atropine sulfate and of di-phenyl acetic acid diethylamino ethanol ester hydrochloride decompose already on standing for a long time at ordinary temperature and considerably more rapidly when the solution is boiled. It is furthermore quite surprising that also the new esters are very active pharmacological substances. It could in no way be foreseen that the products of the invention would exhibit spasmolytic activity, since all hitherto known spasmolytically active basic esters belong to the fatty-aromatic series.

The following examples illustrate the invention, the parts being by weight:

Example 1

31 parts of di-phenyl acetic acid-2-diethylamino ethanol ester are dissolved in a mixture of 200 parts of glacial acetic acid and 6 parts of concentrated sulfuric acid, 2 parts of activated platinum are added and the whole is shaken with hydrogen at about 60° C. When reduction is finished the liquid is decanted from the platinum and the solvent is evaporated. The oil which remains is shaken with water, potassium carbonate solution and ether and the ethereal solution is washed with water, dried by means of potassium carbonate and the ether is evaporated. In this manner there is obtained an oil of boiling point 154–157° C. under 0.2 mm. pressure. This oil is dissolved in petroleum-ether and gaseous hydrogen chloride is passed over the solution, whereby the hydrochloride is precipitated: it may be recrystallized from a mixture of alcohol and petroleum-ether. There is thus obtained in preponderating quantity dicyclohexyl acetic acid diethylamino ethanol ester hydrochloride of melting point 165–166° C., which is more sparingly soluble in petroleum-ether, and a smaller quantity of phenyl-cyclohexyl acetic acid diethylamino ethanol ester hydrochloride of melting point 145–147° C., which is more readily soluble in petroleum-ether.

There may also be used other catalysts, such as for instance a palladium catalyst or mixture of catalysts.

The dicyclohexyl acetic acid-diethylamino ethanol ester forms a sulfocyanide of melting point 93–95° C., a nitrate of melting point 102–104° C., a tartrate of melting point 63° C. with decomposition, a phosphate of melting point 112–114° C., a citrate of melting point 155–158° C. and an oxalate of melting point 120–124° C.

32 parts of dicyclohexyl acetic acid diethylamino ethanol ester and 60 parts of allylbromide are heated in 500 parts of ethyl acetate for 3 hours to boiling, the whole is then cooled and filtered. The bromallylate so obtained, having a melting point 152–153° C., can be recrystallized from a mixture of ethyl-acetate and acetone. In a similar manner the following quaternary salts of dicyclohexyl acetic acid-diethylamino ethanol ester can also be prepared: bromomethylate, melting point 176–177.5° C.; bromethylate, melting point 178–180° C.; and bromobenzylate melting point 155–156° C.

Example 2

1.5 parts of di-phenyl acetic acid-2-diethylamino-ethyl-amide are dissolved in 20 parts of glacial acetic acid and a small quantity of concentrated sulfuric acid is added. 0.1 part of activated platinum is then added to the solution and the whole is shaken with hydrogen at about 50° C. When the calculated quantity of hydrogen has been absorbed the whole is allowed to cool, the liquid is decanted from the platinum and the solvent is evaporated. To the oil which remains water and a sodium carbonate solution are added, dicyclohexyl-acetic acid-2-diethylamino ethyl-amide being thereby precipitated as a solid substance. It is filtered with suction and washed with water. The new product may be recrystallized for example from alcohol of 50 per cent strength and has the melting point 122° C.

By conducting the reduction under somewhat milder conditions there is obtained phenylcyclohexyl acetic acid diethylamino ethyl amide of melting point 84–86° C. which forms a hydrochloride of melting point 169–171.5° C.

*Example 3*

31 parts of di-phenyl acetic acid-2-diethylamino-ethanol ester hydrochloride are dissolved in 300 parts of glacial acetic acid, 3 parts of an activated platinum catalyst are added and the whole is shaken with hydrogen at room temperature. The reaction mixture is worked up in the manner indicated in Example 1, whereby there are obtained the compounds already described in that example.

10 parts of phenyl-cyclohexyl acetic acid diethylamino ethanol ester and 6 parts of methyl-bromide are allowed to stand in 40 parts of ethyl ester at first in the cold for several hours and then at room temperature. After some time the bromomethylate of melting point 174–179° C. crystallized in the form of beautiful crystals.

In a similar manner there may be obtained for example the piperidino-ethanol ester, the diethylamino-butanol ester, the morpholino ethanol ester, the ethyl-acetoxyethyl-amino ethanol ester, the ethyloxypropyl-amino-ethanol ester, the methyl-propyl-amino ethanol ester and the dimethylaminocyclohexanol ester of the phenyl-cyclohexyl acetic acid, as well as quaternary salts of these compounds.

In quite an analogous manner there can also be obtained for example the diethylamino ethanol esters of phenylcyclohexyl-propionic acid and phenylcyclohexylbutyric acid, basic esters of dicyclopentyl acetic acid, the dicyclohexyl acetic acid tropine ester, which forms a hydrochloride of melting point 260–261° C., the α-cyclohexyl-hydracrylic acid-tropine ester sulfate of melting point 211–213° C. (α-cyclohexylhydracrylic acid can be prepared for example by reduction of tropic acid with hydrogen in the presence of platinum), the α,α-dicyclohexyl-α-hydroxy-acetic acid diethylamino ethanol ester hydrochloride of melting point 189–191° C. (α,α-dicyclohexyl-α-hydroxy-acetic acid of melting point 143–144° C. can be prepared for example by catalytic reduction of benzilic acid), the α-phenyl-α-cyclohexyl-α-hydroxy-acetic acid diethylamino ethanol ester, the α-cyclohexyl-hydracrylic acid scopine ester hydrochloride of melting point 209–212° C., the α-cyclohexyl-α-propyl acetic acid diethylamino ethanol ester hydrochloride of melting point 106–108° C. (α-cyclohexyl-α-propyl-acetic acid can be prepared for example by a catalytic reduction of α-phenyl-α-propyl-acetic acid with hydrogen in glacial acetic acid solution in the presence of platinum), the cyclohexyl-acetic acid diethylamino ethanol ester hydrochloride of melting point 116–118° C., the phenyl-cyclohexyl acetic acid ester of ecgoninemethyl ester, the phenyl-dimethylaminocyclohexyl-acetic acid diethylamino ethanol ester and the cyclohexyl-diethylamino ethyl acetic acid diethylamino ethanol ester.

What we claim is:

1. A process for the manufacture of basic esters and amides, which comprises treating with a reducing agent a member of the group consisting of the basic esters and amides of aryl substituted lower fatty acids.

2. A process for the manufacture of basic esters and amides, which comprises treating with a reducing agent a member of the group consisting of the basic esters and amides of poly phenyl substituted lower fatty acids.

3. A process for the manufacture of basic esters which comprises treating with a reducing agent basic esters of di-phenyl acetic acid.

4. A process for the manufacture of basic esters which comprises treating with a reducing agent di-phenyl acetic acid diethylamino ethanol ester.

5. The nuclear reduction products of aminoalkyl esters and amides of aryl substituted lower fatty acids.

6. The nuclear reduction products of aminoalkyl esters and amides of poly phenol substituted lower fatty acids.

7. The nuclear reduction products of aminoalkyl esters of di-phenyl acetic acid.

8. The nuclear reduction products of di-phenyl acetic acid diethylamino ethanol ester.

KARL MIESCHER.
KARL HOFFMANN.